(12) United States Patent
Tenghamn et al.

(10) Patent No.: US 6,982,926 B2
(45) Date of Patent: Jan. 3, 2006

(54) APPARATUS AND METHOD FOR BUBBLE SHIELDING TOWED MARINE CABLE

(75) Inventors: Stig Rune Lennart Tenghamn, Katy, TX (US); Andre Stenzel, Richmond, TX (US)

(73) Assignee: PGS Americas, Inc., Houston, TX (US)

( * ) Notice: Subject to any disclaimer, the term of this patent is extended or adjusted under 35 U.S.C. 154(b) by 89 days.

(21) Appl. No.: 10/264,364

(22) Filed: Oct. 4, 2002

(65) Prior Publication Data

US 2004/0066707 A1 Apr. 8, 2004

(51) Int. Cl.
*G01V 1/38* (2006.01)

(52) U.S. Cl. .................. 367/20; 367/153; 367/154

(58) Field of Classification Search .............. 367/15, 367/106, 153, 166, 176, 20, 154, 130; 181/110, 181/115; 114/253, 67 A, 242, 244, 245; 174/101.5

See application file for complete search history.

(56) References Cited

U.S. PATENT DOCUMENTS

| | | | |
|---|---|---|---|
| 3,895,595 A * | 7/1975 | Kelly et al. ................. 114/243 |
| 4,618,024 A | 10/1986 | Domenico | |
| 4,625,302 A | 11/1986 | Clark | |
| 4,632,213 A | 12/1986 | Domenico | |
| 4,984,218 A * | 1/1991 | Ritter et al. ................. 367/15 |
| 4,987,844 A * | 1/1991 | Nadolink .................... 114/20.1 |
| 5,117,882 A * | 6/1992 | Stanford .................... 114/67 A |
| 5,613,456 A * | 3/1997 | Kuklinski ................. 114/67 A |
| 5,803,410 A * | 9/1998 | Hwang ........................ 244/208 |
| 5,835,450 A * | 11/1998 | Russell ......................... 367/20 |
| 5,959,938 A * | 9/1999 | Behrens ........................ 367/15 |
| 5,967,071 A * | 10/1999 | Wipper ...................... 114/67 A |
| 6,356,816 B1 * | 3/2002 | Katz ............................ 701/21 |
| 2002/0125376 A1 * | 9/2002 | Karniadakis et al. ....... 244/204 |

* cited by examiner

*Primary Examiner*—Ian J. Lobo
(74) *Attorney, Agent, or Firm*—E. Eugene Thigpen; Richard A. Fagin

(57) ABSTRACT

A cable for towing marine devices is disclosed. The cable includes a strength member and at least one conduit associated with the strength member. The conduit has apertures therein at selected locations along the conduit. The apertures are adapted to conduct gas from a source into water in which the cable is disposed. Also disclosed is a method for improving the flow of a cable through water. The method includes releasing a gaseous bubble stream proximate an outer surface of said cable while the water is moving relative to the cable.

35 Claims, 3 Drawing Sheets

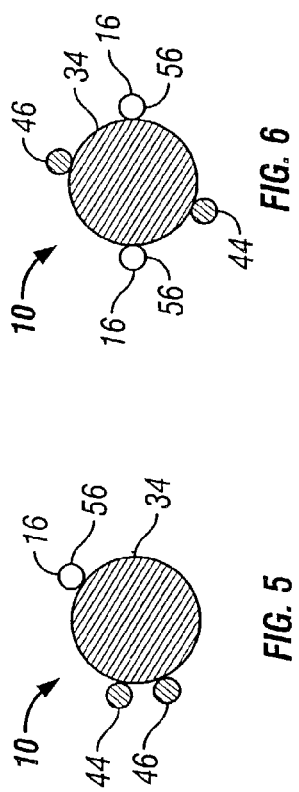
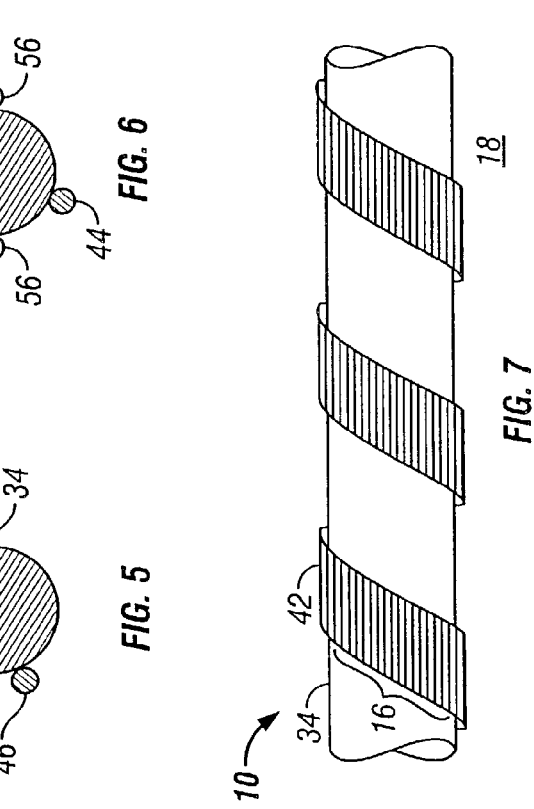
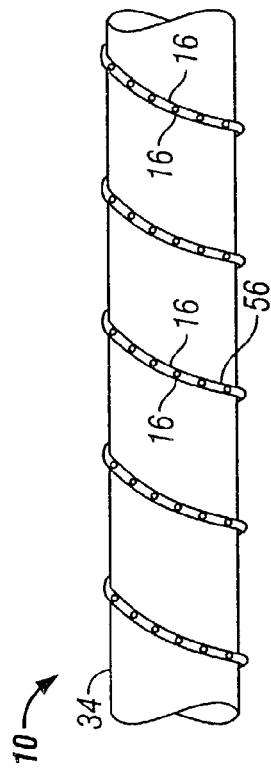

APPARATUS AND METHOD FOR BUBBLE SHIELDING TOWED MARINE CABLE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to the field of marine seismic surveying. More particularly, the invention relates to cables and to systems for towing cables through a body of water. The invention is also related to methods and apparatus for reducing drag of cables moving relative to water.

2. Background Art

Marine seismic surveying is known in the art for determining structures and compositions of geologic formations underlying large geographic areas below the bottom of a body of water. One or more seismic vessels tow cables through the water to transport acoustic energy sources and acoustic signal detectors. It is known in the art for a seismic vessel to simultaneously tow a plurality of laterally spaced apart sensor cables in a wide swath through the water. Each cable in the swath may extend thousands of meters behind the seismic tow vessel.

Lateral separation of the sensor cables from each other in a swath is typically performed by marine diverters, a well known type of which is a paravane. The diverters move the cables laterally from the path of vessel travel. Lateral separation of the sensor cables requires that some of the cables in the acquisition system extend laterally from the direction of vessel travel to be pulled through the water. The resistance resulting from pulling cables laterally through the water greatly increases the energy required for towing the cables, resulting in an increase in fuel cost. The turbulence created by pulling cables laterally through the water also increases acoustic noise, and thus results in an increased noise level in the signals detected by seismic (acoustic) sensors deployed in the cables, thereby reducing the signal-to-noise ratio and degrading the quality of the recorded signals.

Cable drag is a significant force that must be overcome by a seismic tow vessel. Cable drag results from skin friction and surface pressure variations induced by viscous effects, and especially those due to separation bubbles or regions. Separation regions result when three-dimensional boundary layers depart from a body surface. Such separation causes vortex shedding which increases cable drag and induces a type of acoustic noise called "strumming." Such noise interferes with seismic data acquisition and must be filtered from the acoustic signals recorded.

It is not uncommon for seismic energy sources, associated cables and other equipment to produce more than 20,000 pounds (9080 kgf) of drag against a tow vessel Accordingly, a significant amount of energy is expended by a seismic vessel in towing conventional seismic acquisition systems through the water. As the size of marine seismic acquisition systems increases and as the tow speeds increase, a need exists for improved systems to reduce drag forces and to increase tow efficiency through the water.

Compressed air provided by vessel-mounted compressors is used to power air guns in conventional marine seismic operations. In additional to using compressed air to generate seismic signals, it is known in the art to release air bubbles in water to modify the seismic signal generated by marine air guns. For example, U.S. Pat. No. 4,618,024 issued to Domenico (1986), U.S. Pat. No. 4,625,302 issued to Clark (1986), and U.S. Pat. No. 4,632,213 issued to Domenico (1986) each discloses a seismic source system releasing bubbles to form a gas-water mixture paraboloid or "acoustic lens" in the water. Moreover, U.S. Pat. No. 5,959,938 issued to Behrens (1999) discloses a manifold for releasing bubbles in water to control the bubble size and attenuation characteristics of the water. None of these references, however, discloses using gas or air to reduce drag of the seismic array components being towed through the water.

There is a need to increase tow efficiency, a result of which would be fuel savings. Less cable drag could also increase the tow capacity of a seismic vessel and could also enable laterally wider arrays to be towed during seismic surveying.

SUMMARY OF THE INVENTION

One aspect of the invention is a method for improving the flow of a cable through water. The method includes releasing a gaseous bubble stream proximate an outer surface of the cable as the cable moves with respect to the water.

Another aspect of the invention is a cable for towing marine devices. The cable includes a strength member and at least one conduit associated with the strength member. The conduit has apertures therein at selected locations along the conduit. The conduit and associated apertures are adapted to conduct gas from a source into water in which the cable is disposed.

Other aspects and advantages of the invention will be apparent from the following description and the appended claims.

BRIEF DESCRIPTION OF THE DRAWINGS

FIG. 5 shows another embodiment of a cable having a gas conduit disposed externally to a strength member.

FIG. 6 shows an embodiment of a cable having a plurality of gas conduits disposed externally to the strength member.

FIG. 7 illustrates an embodiment of a gas conduit helically wrapped around a strength member.

FIG. 8 illustrates another embodiment of a gas conduit helically wrapped around a strength member.

FIG. 9 shows an embodiment of gas conduits formed into a sheath wrapped around the exterior of a strength member.

FIG. 10 shows an embodiment of a gas conduit having different sized apertures along its length associated with a strength member.

DETAILED DESCRIPTION

The invention provides a system for increasing the efficiency with which a cable moves relative to water. One particular application of the invention is related to towing cables behind a vessel. Generally speaking, embodiments of a towed cable system according to the invention include a conduit for distributing air or gas bubbles proximate the surface of the towed cable to reduce the drag forces on the cable as it is towed through the water. More specifically, a cable according to the invention is typically used where the cable extends in a direction at least in part transverse to a direction of motion of the water with respect to the cable length. In seismic surveying, such a cable would extend at least in part transversely to a direction of motion of a seismic vessel.

Figure 1:
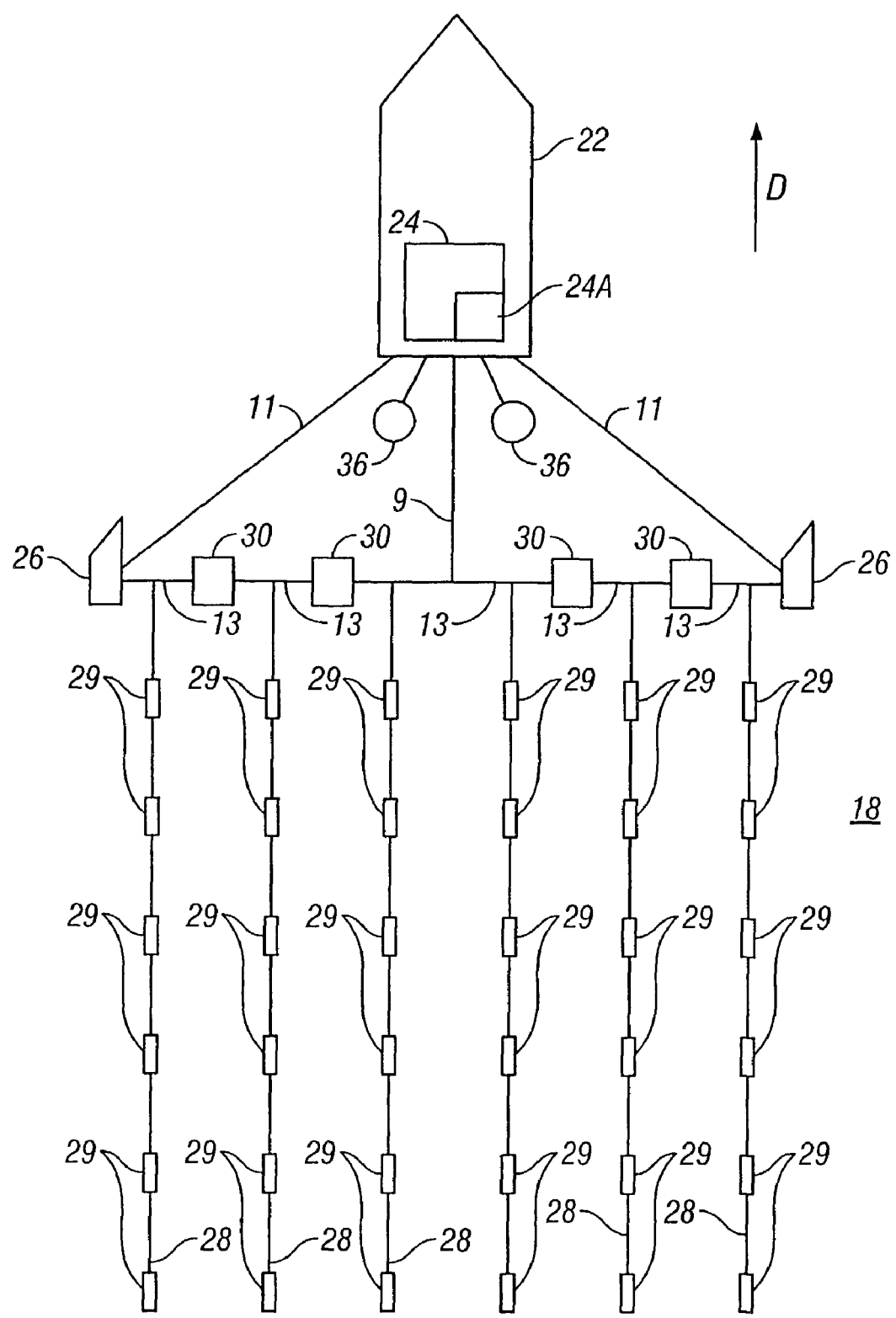
FIG. 1 illustrates a schematic of a tow vessel and associated cables in a seismic acquisition system.

FIG. 1 shows a typical configuration for a marine seismic data acquisition system. A seismic vessel 22 is shown moving in a selected direction, indicated by reference designator D. The vessel 22 tows a lead in cable 9 located roughly centrally behind the vessel 22. The vessel 22 also tows, at each side thereof, a diverter tow cable, each of which is shown at 11. A marine diverter 26 is disposed at the trailing end of each diverter tow cable 11 to exert a lateral thrust on the diverter tow cables 11 to spread them laterally away from the center of the vessel 22 as the vessel 22 travels along the selected direction D.

The diverters 26 are held at a selected lateral distance from each other in a direction transverse to the direction of motion D. The selected lateral distance is controlled by lengths of spreader cables 13 disposed between the diverters 26. Attached to the spreader cables 13 at selected positions along the length of the spreader cables 13 are plurality of streamer cables 28. Each streamer cable 28 includes a plurality of seismic sensors, usually hydrophones, at selected positions along each streamer cable 28. The seismic sensors are each shown generally by reference numeral 29. The vessel is also shown towing two seismic energy sources 36, which may be air gun arrays of any type well known in the art. While in the present embodiment the seismic sources 36 are air gun arrays, any other type of seismic energy source may be used with the invention, and therefore the type of seismic source is not intended to limit the scope of the invention.

FIG. 1 shows the vessel 22 pulling six such streamer cables 28 and two seismic energy sources 36, however, marine seismic acquisition systems known in the art use different numbers of streamer cables and seismic sources. Therefore, the number of streamer cables and seismic energy sources shown in FIG. 1 is not intended to limit the scope of the invention. In the configuration shown in FIG. 1, the diverter tow cables 11 and the spreader cables 13 all extend, to a greater or lesser extent, laterally from the center of the vessel in a direction transverse to the direction of vessel travel D. It is understood that other configurations may be used for deploying a plurality of streamer cables behind a towing vessel, but whatever configuration is used for maintaining a plurality of streamer cables at selected laterally spaced apart positions behind a towing vessel, there will be a need to pull at least one cable having a laterally extending component through the water 18. Laterally as used herein means in a direction transverse to the direction of motion D of the vessel 22. In the embodiment shown in FIG. 1, cables having at least some lateral component along the length thereof include the diverter tow cables 11 and the spreader cables 13. Cable structures according to the invention, which will be explained below, are typically used where such cables extend laterally with respect to the direction of motion of the water with respect to the cable, as previously explained. In the system shown in FIG. 1, cables according to the invention would typically be used for the diverter cables 11 and spreader cables 13.

The vessel 22 also typically includes a seismic recording system 24 which may include signal recording devices (not shown), seismic source controllers (not shown), navigational equipment (not shown) and an air compressor 24A which provides air to be controllably discharged by the seismic sources 36, and provides compressed air to cables made according to the invention, as will be further explained. The recording system 24 and its components may be of any type well known in the art. The compressor 24A, as it relates to the invention, is one type of a source of compressed air or gas. Using a cable according to the invention only requires a gas source, which, for example, may be in the form of a tank of compressed gas (or air), as an alternative to the compressor 24A shown in FIG. 1

The system shown in FIG. 1 further includes air pressure sensors/control valves 30 (or pressure regulators), which may be disposed at selected positions along the spreader cables 13 as shown in FIG. 1. The purpose of the control valves 30 will be further explained. Other embodiments of a system may not include control valves.

Having shown generally a towed cable system which may use a cable according to the invention, several general forms of a cable according to the invention will now be explained. Broadly described, a cable according to the invention includes a strength member and a gas (or air) conduit associated with the strength member. In some embodiments of a cable according to the invention the gas (or air) passageway, chamber or conduit is integrally formed with the strength member. The conduit includes apertures which conduct the gas or air from within the conduit to locations proximate to or on the exterior surface of the cable. In other embodiments, the conduit forms a separate structure associated with the strength member.

In some embodiments, the size, geometric arrangement and/or density of the apertures are selected to provide a particular distribution of air or gas bubbles around the cable as it is towed through the water.

Any embodiment of a cable according to the invention may or may not include electrical conductors and/or optical fibers to conduct electrical power and signals to and from the various devices towed by the cable.

Figure 2:
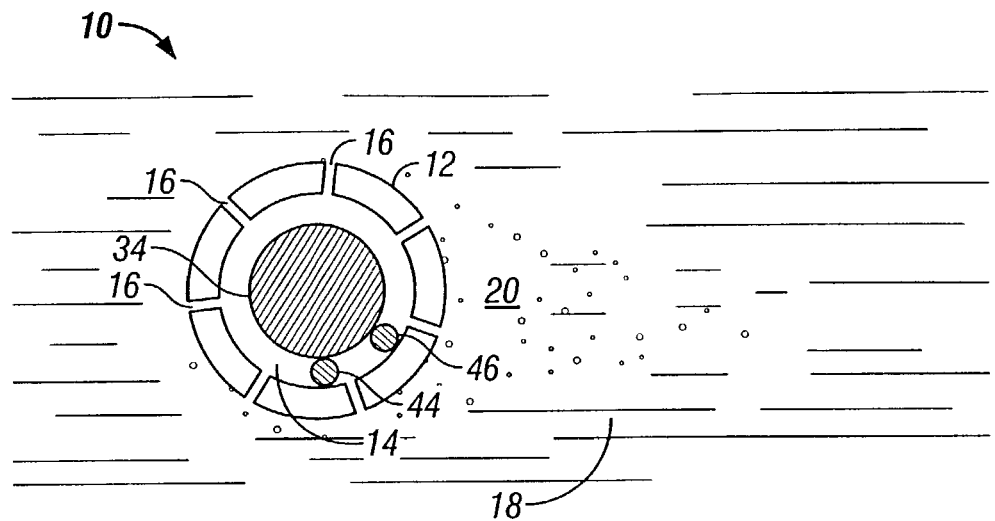
FIG. 2 illustrates an embodiment of a cable having a hollow interior passage for distributing bubbles through apertures in the cable exterior surface.

Having described embodiments of a cable according to the invention in very general terms, specific embodiments of a cable according to the invention will now be explained. FIG. 2 illustrates one embodiment of a cable 10 having a strength member, which in this embodiment is an exterior armor 12. The exterior armor 12 may be formed from steel, woven high strength fiber, or other material known in the art for forming an exterior armor on a cable. The exterior armor 12 defines a conduit within the interior of the armor 12. In some embodiments, such as shown in FIG. 1, the conduit is an annulus 14 formed between the exterior armor 12 and an interior strength member or reinforcing cable, shown generally at 34. The reinforcing cable 34 may be formed from wire rope, steel, woven high-strength fiber or any other material known in the art to be used as a cable reinforcing member.

A plurality of apertures 16 are located in the exterior armor 12 and can communicate gas or air between the annulus 14 and the water 18 surrounding the cable 10. As air or other gas is delivered into the annulus 14 from a source such as the compressor (24A in FIG. 1). Such air or gas is released through the apertures 16 and into the water 18 to form a plurality of air bubbles proximate to the exterior of the armor 12. The size of such air or gas bubbles depends on the pressure of the air or gas in the annulus 14 and on the size, configuration, and orientation of the apertures 16. As will be further explained with respect to FIG. 10, the size and configuration of the apertures 16 may be selected in some embodiments to provide a predetermined distribution, pattern or arrangement of the air or gas bubbles.

As illustrated in FIG. 2, the plurality of bubbles released from the apertures 16 form a shield or "bubble zone", shown generally at 20, which has a lower density than the surrounding water 18. If the water 18 is moving past the exterior armor 12, such as in a cable subjected to a moving water current, or in a body of water wherein the cable 10 is towed or otherwise moved laterally through the water 18, then the bubble zone 20 will be distributed in a shape substantially as illustrated in FIG. 2.

In a portion of the bubble zone 20 proximate to the exterior surface of the exterior armor 12, drag forces acting against the exterior surface of the armor 12 are reduced, and vortex shedding around the cable 10 is also reduced, thereby reducing strumming and other vibration induced by movement of the cable 10 through the water 18. Reductions in cable drag facilitate laminar flow of the water 18 past the cable 10, and improve the overall tow efficiency of a vessel moving such a cable through water 18, for example, the marine seismic acquisition vessel and system shown in FIG. 1.

As illustrated in FIG. 2, the annulus 14 provides a conduit for conveying compressed gas or air through cable 10. Because such compressed air or gas is less dense than the water 18 displaced, the compressed air also provides buoyancy to the cable 10 to help support the cable 10 at a selected elevation below the surface of the water 18. The embodiment shown in FIG. 2 may also be made without the reinforcing strength member 34.

The cable 10 of FIG. 2 may also include at least one electrical conductor 44 and at least one optical fiber 46 for carrying electrical power and signals between the vessel (22 in FIG. 1) and the devices towed by the cable (such as sensors 29 in FIG. 1 and diverters 26 in FIG. 1). Other embodiments may not have either electrical conductors or optical fibers.

Figure 3:
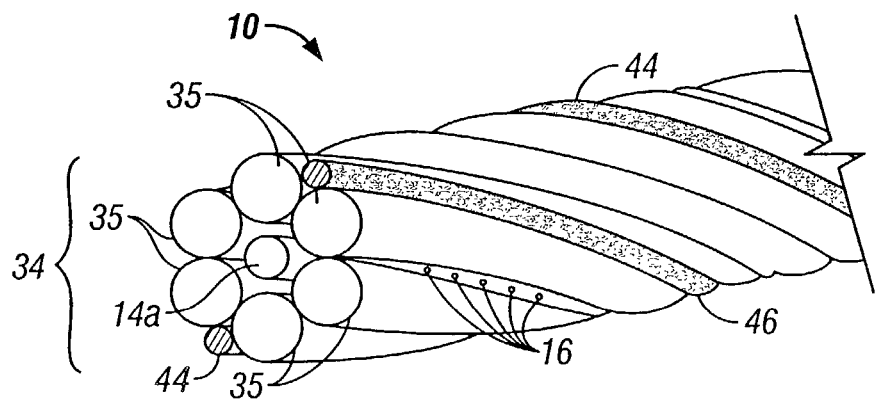
FIG. 3 shows an alternative embodiment to the cable shown in FIG. 2.

Another configuration of the conduit which is integrally formed within a strength member is shown in FIG. 3. In the embodiment of FIG. 3, the strength member 34 comprises a plurality of wire rope or armor strands, shown individually at 35, wound around a conduit 14A in a well-known helical configuration. The armor strands 35 may be made from any material known in the art for making cable armor or strength members. The conduit 14A in the embodiment of FIG. 3 may include a separate tube or hose, or may be formed only by the helical wrap of the armor strands 35 around the center of the pattern formed by the armor strands 35. The conduit includes apertures 16 as in the previous embodiment for conducting gas or air to locations proximate an outer surface of the cable 10. The apertures 16 in the embodiment of FIG. 3 may include discrete, small tubes extending from the conduit 14 to proximate the outer surface of the armor strands 35, or may be formed as interstices between armor strands 35 during the wrapping of the cable 10. The embodiment shown in FIG. 3 may also include at least one electrical conductor 44 and at least one optical fiber 46.

As previously explained, other embodiments of a cable according to the invention may include a conduit or hose formed separately from the strength member. In one such embodiment, shown in FIG. 4, gas or air may be conveyed along the length of the cable 10 in a tube 52 disposed along the exterior of the strength member 34. The strength member 34 may be wire rope, woven fiber or any other similar structure used to form a strength member for a cable, as in previously described embodiments. The tube 52 may be formed from any suitable substantially impermeable material. The cable 10 may include an exterior armor sheath, such as shown at 54, formed from high strength material such as steel or woven high strength fiber and disposed externally to both the strength member 34 and the tube 52. The tube 52 includes apertures 16 along its length to enable gas to be released into the water 18 as in the previously explained embodiments. The apertures 16 penetrate the exterior armor 54 as well. The tube 52 may extend longitudinally along the strength member 40, or may be helically wound thereon. The embodiment shown in FIG. 4 may also include at least one electrical conductor 44 and at least one optical fiber 46. Other embodiments configured similarly to the embodiment of FIG. 4 may exclude either or both the electrical conductor and the optical fiber.

Figure 4:
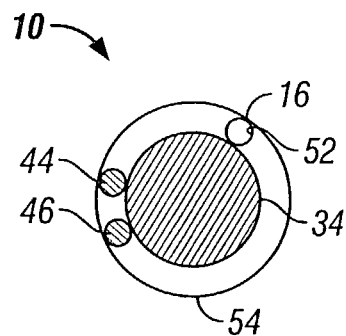
FIG. 4 shows an embodiment of a cable having a gas conduit disposed externally to a strength member.
Figure 4A:
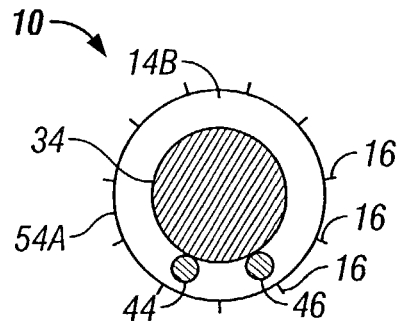
FIG. 4A shows an alternative embodiment of the cable of FIG. 4.

An alternative to the embodiment of FIG. 4 is shown in FIG. 4A. In FIG. 4A, the tube 52 is omitted, and the conduit 14B is formed in an annular space between an exterior sheath 54A and the strength member 34. The exterior sheath includes apertures 16 therein as in previously described embodiments. The sheath 54A may be formed from steel, woven fiber or other material that resists abrasion and is strong enough to move in water without damage. The embodiment of FIG. 4A may also include at least one electrical conductor 44 and/or at least one optical fiber 46.

In other embodiments, as previously explained, a gas or air transporting conduit extends along the exterior of the strength member. One such embodiment of a conduit is shown in FIG. 5, which includes a strength member 34 having a conduit 56 disposed along the outer surface of the strength member 34. The strength member 34 may be wire rope, woven fiber or any other similar structure used to form a strength member for a towing cable. The conduit 56 may extend directly along the length of the strength member 34 or may be helically wrapped around the strength member 34. Helical winding of the conduit 56 is shown in FIG. 8. Referring again to FIG. 5, the conduit 56 includes apertures 16 therein to release gas or air to create bubbles along the length of the cable 10. In the embodiment shown in FIG. 5, the conduit 56 comprises a substantially round cross-section hose or tube, however, other cross section shapes may be used in different embodiments. The conduit 56 may be formed from any suitable substantially impermeable material. Preferably the conduit 56 is formed from a material which will substantially maintain its cross-sectional shape as the cable 10 moves relative to surrounding water. The embodiment shown in FIG. 5 may also include at least one electrical conductor 44 and at least one optical fiber 46. Other embodiments configured similarly to the embodiment of FIG. 5 may exclude either or both the electrical conductor and optical fiber.

An embodiment shown in FIG. 6 is similar in most respects to the embodiment of FIG. 5, except that the embodiment of FIG. 6 includes two or more conduits 56 having apertures 16 therein. In the embodiment of FIG. 6, the conduits 56 are disposed on opposite sides of the strength member 34, but the conduits 56 may be disposed at any other position about the circumference of the strength member 34. As in the previously described embodiments, the embodiment of FIG. 6 may include at least one electrical conductor 44 and at least one optical fiber 46.

In another embodiment, shown in FIG. 7, the conduit, shown at 42, comprises a tube or hose having a substantially flat rectangular or elliptical cross section. The conduit 42 also includes apertures 16 therein to communicate gas or air from within the conduit 42 to the water 18 surrounding the strength member 34. As in the embodiment shown in FIG. 8, the conduit 42 in the embodiment of FIG. 7 is helically wound around the exterior of the strength member 34. Alternatively, the conduit 42 may extend along the length of the strength member 34. An advantage that may be provided by the embodiment of FIG. 7 is that the conduit 42 may be better able to retain its cross-sectional shape as the cable 10 moves with respect to surrounding water.

In another embodiment, shown in FIG. 9 the cable 10 includes a strength member 34, such as formed from wire rope or the like. The strength member 34 may have disposed on it exterior surface or embedded therein at least one electrical conductor 44 and at least one optical fiber 46 for carrying electrical power and data signals, respectively, as in other embodiments. External to the strength member 34 is a sleeve 42 having channels 50 formed therein or on an exterior surface thereof. The sleeve 42 may be formed from an elastomeric material. The channels 50 form conduits for enabling passage of gas or compressed air. The channels 50 each include apertures 16 therein at selected positions to enable gas or air to move from the channels 50 into the water 18.

In the foregoing embodiments described above with respect to FIGS. 4, 5, 6, 7, 8 and 9 the strength member may be any suitable form of cable reinforcing strength member such as wire rope in braided or helically wound form, or any other flexible, tensile strength imparting device known in the art for use as a towing or support cable. Typically the strength member is made from steel or other high strength material, but it may also be partially or totally formed from fiber, fiber reinforced plastic or other material known in the art for use as a cable reinforcement or strength member. Accordingly, the exact structure and composition of the strength member are not intended to limit the scope of the invention.

FIG. 10 illustrates one embodiment of cable 10 wherein apertures 16A, 16B are positioned in different selected patterns on the cable exterior surface. By selecting the configuration of apertures, such as the helical pattern for apertures 16A, or the circular patter for apertures 16B, the distribution of air bubbles and the performance of the bubble zone (20 in FIG. 2) can be selected to suit a particular need or application. FIG. 10 also illustrates that the apertures 16A, 16B can also have sizes chosen to selectively control the size and distribution of air (or gas) bubbles as the bubble zone (20 in FIG. 2) is generated proximate to exterior surface of the cable 10. Different parameters of the apertures can be changed, such as increasing the size cross sectional area of the apertures as such apertures are located farther and farther away from the compressor (24A in FIG. 1). Because the pressure of compressed air or gas within the conduit (irrespective of its configuration) decreases from the end proximate the compressor (24A in FIG. 1) to the distal end of cable 10, due to compressed air release through apertures 16 and due to internal friction of the moving air within the chamber (14 in FIG. 2), one embodiment of the invention includes smaller apertures (such as shown at 16A) near the compressor-connected end of the cable 10, and includes gradually increasing size apertures at distances farther and farther from the compressor (24A in FIG. 1).

Referring once again to FIG. 1, air pressure sensors/control valves 30 can be attached to the cable (e.g. diverter tow cables 11 and/or spreader cables 13) to monitor the pressure of the compressed air within interior passages (such as passage 14 in FIG. 2) at selected positions along the cable. Operation of the sensors/control valves 30 can be linked with a controller (not shown) to selectively increase or decrease the compressed air pressure supplied to discrete portions of the cable. Compressed air or gas pressure balancing or unbalancing of the cable can be performed in order to perform different functions. Compressed air pressure can be increased to discrete portions of cable 10 while air pressure is decreased to other portions of cable 10, for example. Performance of cable 10 can be monitored in operation under tow and the performance characteristics of bubble zones 20 along different portions or cable exterior surface can be modified interactively.

The invention provides a bubble zone (20 in FIG. 2) proximate to a tow cable that can induce a transition from laminar to turbulent flow and can reduce vortex shedding as the cable is moved relative to water. The invention is particularly suited for vessels towing a cable through water, and more specifically is suited to seismic vessels towing sources and seismic sensor arrays. However, the invention is also applicable to uses where a relatively stationary cable is subjected to moving water. The invention is useful in applications where water moves relative to a cable, where the motion includes at least some component transverse to the length of the cable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for improving the flow of water past a cable comprising:
   releasing a gaseous bubble stream proximate an outer surface of said cable, while the water is moving with respect to the cable, the releasing being performed so as to provide a preselected geometry of gas bubbles substantially completely surrounding the cable, the moving being in a direction at least partially transverse to a length of the cable.

2. The method as defined in claim 1 wherein the releasing is performed over substantially an entire length of the cable.

3. The method as defined in claim 1 further comprising controlling a flow of gas through a conduit along a length of the cable so that the gaseous bubble stream is released at a substantially constant rate along the length of the cable.

4. A method for improving the flow of a cable through water comprising:
   towing the cable through the water, the towing performed such that a length of the cable is at least partially transverse to a direction of movement of the cable through the water;
   conducting gas from a gas source along the length of a cable; and
   releasing the gas into the water at locations proximate a surface of the cable to form a bubble shield having a preselected geometry of gas bubbles substantially completely surrounding the cable.

5. The method as defined in claim 4 wherein the releasing the gas is performed over substantially an entire length of the cable.

6. The method as defined in claim 4 further comprising controlling a flow of gas through a conduit along a length of the cable so that the gas is released at a substantially constant rate along the length of the cable.

7. An apparatus for towing seismic exploration equipment in a body of water, comprising:
a cable extending behind a vessel, the cable comprising at least one strength member, the cable extending in a direction at least partially transverse to a direction of motion of the cable through the water;
a source of gas; and
at least one conduit for conveying gas from the source along the cable, the at least one conduit having apertures for conveying the gas from within the conduit into water proximate an outer surface of the cable, the apertures arranged such that the gas forms bubbles in a preselected geometry substantially completely surrounding the cable.

8. The apparatus as defined in claim 7 wherein the at least one conduit comprises a passage formed integrally with the at least one strength member.

9. The apparatus as defined in claim 8 wherein the at least one strength member comprises an outer armor.

10. The apparatus as defined in claim 8 wherein the at least one strength member comprises a plurality of strands helically wound around the at least one conduit.

11. The apparatus as defined in claim 7 wherein the at least one conduit is disposed externally to the at least one strength member.

12. The apparatus as defined in claim 11 wherein the conduit is helically wound around an exterior surface of the at least one strength member.

13. The apparatus as defined in claim 7 wherein the at least one conduit comprises a sheath disposed about an exterior surface of the cable, the sheath having a diameter selected to provide an annular space between the exterior surface of the cable and an interior surface of the sheath.

14. The apparatus as defined in claim 7 wherein the apertures comprise at least one of a size and a geometric arrangement adapted to produce a bubble shield having the preselected geometry with respect to an exterior of the cable.

15. The apparatus as defined in claim 7 wherein the gas comprises compressed air.

16. The apparatus as defined in claim 7 wherein a size of the apertures is related to a distance along the cable from a source of compressed gas.

17. The apparatus as defined in claim 7 further comprising at least one pressure sensor and at least one pressure control valve disposed at a selected position along the cable, the sensor and control valve adapted to provide a selected gas pressure in the conduit proximate the selected position.

18. The apparatus as defined in claim 7 wherein the cable comprises at least one electrical conductor.

19. The apparatus as defined in claim 7 wherein the cable comprises at least one optical fiber.

20. A marine seismic surveying system comprising:
a tow vessel;
at least one towing cable coupled to the tow vessel, the at least one towing cable comprising a strength member and at least one conduit associated with the strength member, the conduit having apertures therein at selected locations, the apertures adapted to conduct gas from within the conduit into water in which the at least one towing cable is disposed, the apertures arranged to cause the gas to form a bubble layer having a preselected geometry substantially completely surrounding the cable, the at least one towing cable extending at least partially in a direction transverse to a direction of motion of the tow vessel;
at least one streamer cable operatively coupled to the at least one towing cable; and
a source of gas operatively coupled to the at least one conduit.

21. The system as defined in claim 20 wherein the at least one conduit comprises a chamber formed inside the strength member.

22. The system as defined in claim 20 wherein the at least one conduit is disposed externally to the strength member.

23. The system as defined in claim 20 wherein the conduit is helically wound around the strength member.

24. The system as defined in claim 20 wherein the at least one conduit comprises a sheath disposed externally to the strength member, the sheath having a diameter selected to provide an annular space between the exterior surface of the strength member and an interior surface of the sheath.

25. The system as defined in claim 20 wherein the apertures comprise at least one size and a geometric arrangement adapted to produce a bubble shield having the preselected geometry with respect to an exterior of the cable.

26. The system as defined in claim 20 wherein the source comprises an air compressor.

27. The system as defined in claim 20 wherein a size of the apertures is related to a distance along the cable from the source.

28. The system as defined in claim 20 wherein the at least one conduit comprises a sheath disposed about the exterior of the strength member, the sheath having at least one passage formed therein, the at least one passage extending along a length of the sheath.

29. The system as defined in claim 20 further comprising at least two conduits disposed externally to the strength member, the at least two conduits disposed on diametrically opposite sides of the strength member.

30. The system as defined in claim 29 wherein the at least two conduits are helically wound around the strength member.

31. The system as defined in claim 20 wherein the at least one towing cable comprises at least one electrical conductor for conducting power to the at least one streamer cable.

32. The system as defined in claim 20 wherein the at least one towing comprises at least one optical fiber for conducting signals from the at least one streamer cable to a recording system.

33. The system as defined in claim 20 further comprising at least one gas pressure sensor and control valve disposed at a selected position along the at least one towing cable.

34. The system as defined in claim 33 wherein the at least one pressure sensor and control valve comprise a pressure regulator.

35. The system as defined in claim 20 further comprising at least one additional seismic streamer cable operatively coupled to the at least one tow cable and means for maintaining the at least one seismic streamer cable and the at least one additional streamer cable at a selected lateral spacing from each other.

* * * * *